Jan. 21, 1947.  K. NORMAN  2,414,482
ELECTRIC SOLDERING IRON
Filed Oct. 18, 1943
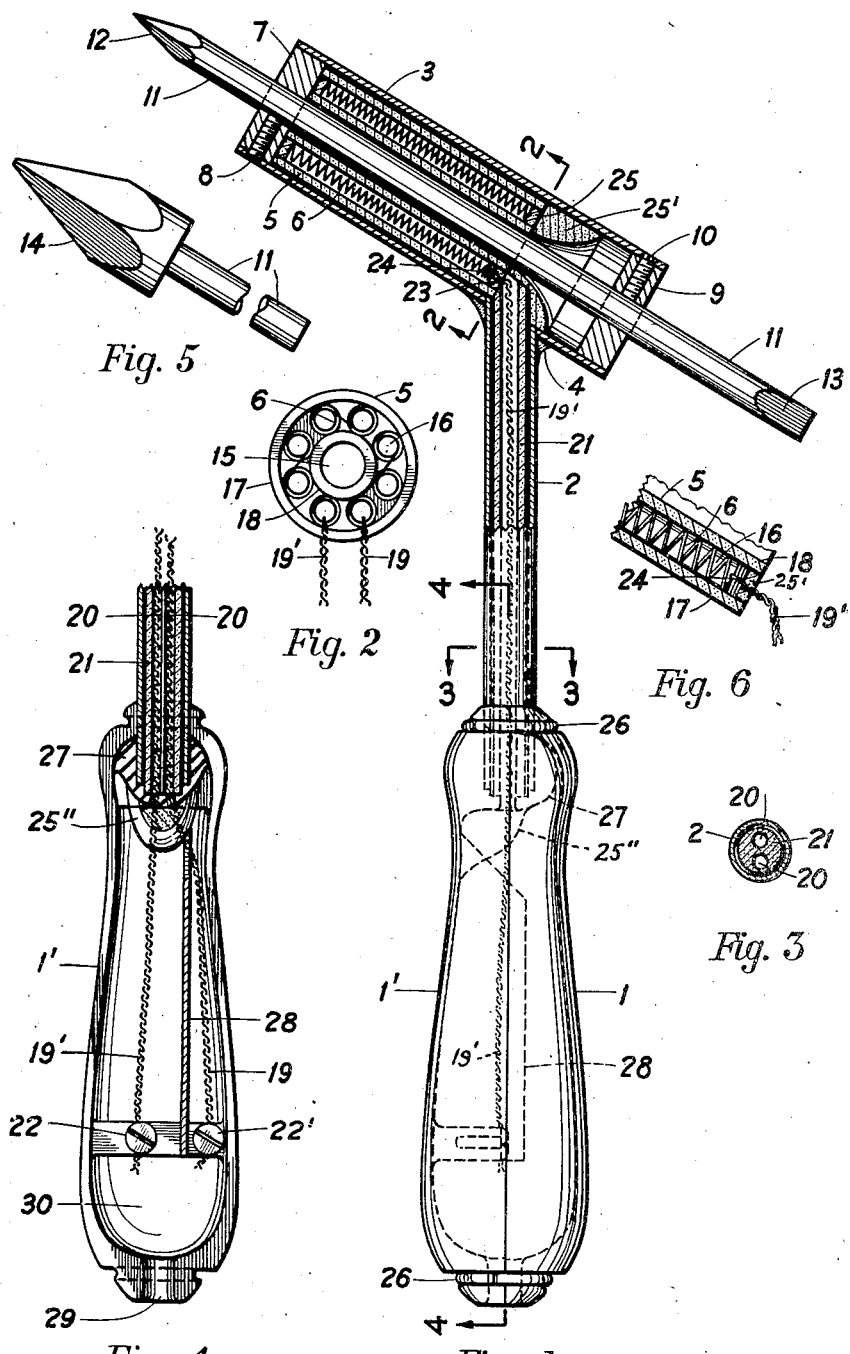
INVENTOR.
KELSO NORMAN
BY
Attorney Patented Jan. 21, 1947

2,414,482

UNITED STATES PATENT OFFICE 2,414,482

ELECTRIC SOLDERING IRON

Kelso Norman, San Francisco, Calif.

Application October 18, 1943, Serial No. 506,655

1 Claim. (Cl. 219—26)

This invention relates to electric soldering irons and has for its objects improvements in construction of such irons whereby the tool is adapted to a greater variety of uses than prior electric irons of this type, the bit is adjustable in projection and rotation, changeable end for end, various bits are interchangeable, and the heating element is a separate unit unattached to the bit. Other features and advantages of the construction will appear in the following description and accompanying drawing.

In the drawing,

Fig. 1 is a side view of my electric soldering iron with the head portion and part of the shank shown in longitudinal cross section.

Fig. 2 is an enlarged end view of the heating element as seen from the line 2—2 of Fig. 1.

Fig. 3 is a cross section of the shank of the soldering iron as seen from the line 3—3 of Fig. 1.

Fig. 4 is a view of one half of the "split" handle of the soldering iron as seen from the line 4—4 of Fig. 1.

Fig. 5 is a side view of an optional form of "bit" for use in place of the plain rod form of bit shown in Fig. 1.

Fig. 6 is an enlarged fragmentary section of the heating element to better show the terminal wire connection.

In detail the soldering iron comprises a hollow handle 1 of insulating material, a tubular metal shank 2 rigidly secured to the handle, a metal cylindrical head 3 integrally secured to the shank 2 as by welding 4, a hollow spool-like heating element 5—6 freely fitting within the head, a metal stop collar 7 within the forward end of the head and held in place by a set screw 8 screwed through the side of the head, a rear collar 9 with its set screw 10, and a bit shown in Fig. 1 as a plain round copper rod 11 slidably passing through both collars and the hollow heating element and projecting beyond the head at both ends when first supplied, but which in use will wear down at one or both ends depending on how much sharpening it undergoes.

The bit 11 shown in Fig. 1 is of uniform diameter and may be easily pushed entirely through the head and reversed when desiring to use the chisel bit point shown at 13 instead of the point 12, or it may be locked at any desired degree of extension by means of one or both set screws, 8, 10, or the bit may be removed in a moment and replaced with any other special formed bit or the one shown in Fig. 5 which is provided with an enlarged nose 14 secured to the regular size bit rod 11 preferably as by being welded or cast thereto.

The heating element comprises an elongated cylindrical spool 5 preferably of highly refractory porcelain or similar ceramic insulator spool and has a central bore 15 of a size to slidably fit the copper bit rod 11, and surrounding this bore is a plurality of smaller holes 16 preferably eight, extending entirely through the spool, but recessed somewhat within both ends of the spool so as to leave an outer and an inner circular wall, 17 and 18.

Within the small holes is a long spiral coil 6 of suitable resistance wire passing zigzag back and forth from one hole to another with the two ends of the coil extending toward the inner end of the spool in the two adjacent lower holes and therein connected each to a heavier doubled over and twisted lead-in or terminal wire 19, 19' which extend the remaining short distance out of the spool and respectively into one of the two longitudinal channels 20, in a tube 21 of insulating material positioned within the hollow shank 2, and into the hollow handle 1 of the iron to the terminal block screws 22, 22' where they are to be connected to the power wires not shown.

The insulating tube 21 is also preferably a high refractory or porcelain like the spool 5 and is cut off at an angle on its upper end as at 23 to fit against the rear end of the spool 5 to receive the terminal wires. The resistance coil is preferably formed as an almost closed coil spring and is stretched a definite amount in each hole 16 then kinked over to the next hole, etc. The terminal wires are first passed through two or three coils at the end of the spring as at 24 then doubled over and pinched tight and twisted together for their full length.

After the coil is threaded through the spool as described, its recessed ends are both filled with an insulating refractory cement 25 and let harden so as to form a separate finished unit.

When placing the heating unit into the body, the unit is smeared with the same refractory cement in paste form and the interior of the body coated also if desired and the unit inserted after poking the terminal wires down the (empty) shank. Some cement paste is then applied to the inner end of the heating unit and/or to the beveled off end of the porcelain tube 21 and this is pushed up through the shank until it forms a cemented contact with the end of the spool and after which a cement filling as at 25' is applied tapering away from the inner end of the unit while leaving a clear central hole for the bit rod 11 to slide.

Hollow handle 1 is split or divided, but one-half only supports the shank and the wire terminal blocks and both halves are simply placed in confronting relation and secured together as by strong spring split snap rings 26, sprung into circular grooves at the ends of the handle as indicated. Or the two halves of the handle may be otherwise secured together.

The half of the handle to which the shank is secured is the left-hand one of Fig. 1 designated 1' and the open side of which is shown in Fig. 4 and wherein it will be seen to be provided with an integrally formed ball portion 27 at its upper end into which the shank is rigidly secured as by cementing or vulcanizing or by any other means. A large mound of cement 25'' is also banked up at the lower end of the shank tube and ball to hold up the insulating tube 21 as well as to separate the lead wires and guide them to opposite sides of a vertical rib or partition 28 formed within the handle.

From the preceding description it will be seen that the hollow metal head welded to the hollow metal shank forms an integral unit which will never separate as do most prior soldering irons of this type. Also by provision of the two removable collars 7 and 9 the heating element, if burnt out from long use, may easily be replaced, for it suffices to release the lead wires 19, 19' from the screws 22, 22', chip out the cement mound 25'' from the handle, then punch out the element spool in a forward direction from the head so that it will drag the lead wires with it, then replace the element with a fresh one.

Besides the adjustability of the bit and interchangeability with other shapes, reversibility end for end, etc. as mentioned, it may be mentioned the extra long area of the bit is entirely surrounded by the heating coils. Also that when the bit wears down to the point where but half of it projects into the spool a new bit shoved in from the rear end in contact with the worn one will insure full heating capacity. By reason of the bit extending entirely through the head any sticking of the bit from corrosion may easily be overcome by tapping it slightly at the rear end when the set screws 8, 9, are released. An important feature is the solid ceramic insulation throughout without the use of mica, or more or less loose materials like asbestos. The hollow divided handle makes it easy to pass the power cord through the hole 29 in the lower end of the handle and connect its wires to the terminal screws 22, 22', and the large hollow space 30 below the terminal block provides plenty of room for knotting the cord to prevent withdrawal or pulling against the terminal strands secured by the screws.

My use of the word "porcelain" for the substance of which the spool and terminal wire tube is preferably made, is intended to include any equivalents in high heat resisting insulators such as glass, lava, etc.

Having thus described my improvements in an electric soldering iron, what I claim is:

In an electric soldering iron, a heating element comprising a solid ceramic spool with a central passage for the soldering bit and a circular row of holes around said passage through which a coil of resistance wire is threaded back and forth from one hole to the other, and the ends of said spool both being recessed and filled with a refractory insulating cement covering the ends of the holes and coils and with terminal wires projecting at one end, the connection of said terminal wires to the resistance coils being within the holes in which the resistance wire coils are positioned.

KELSO NORMAN.